(12) United States Patent
Shefi et al.

(10) Patent No.: US 7,113,516 B1
(45) Date of Patent: Sep. 26, 2006

(54) TRANSMIT BUFFER WITH DYNAMIC SIZE QUEUES

(75) Inventors: Yotam Shefi, Rosh Ha'ayin (IL); Onn Haran, Kfa-Saba (IL); Oren Barazovesky, Jersusalem (IL)

(73) Assignee: Texas Instruments Incorporated, Dallas, TX (US)

( * ) Notice: Subject to any disclaimer, the term of this patent is extended or adjusted under 35 U.S.C. 154(b) by 877 days.

(21) Appl. No.: 09/723,558

(22) Filed: Nov. 28, 2000

(51) Int. Cl.
*G06F 13/00* (2006.01)

(52) U.S. Cl. ...................... 370/412; 711/153
(58) Field of Classification Search ........ 370/412–418; 711/153
See application file for complete search history.

(56) References Cited

U.S. PATENT DOCUMENTS

| | | | |
|---|---|---|---|
| 5,893,162 A | | 4/1999 | Lau et al. |
| 6,085,276 A | | 7/2000 | VanDoren et al. |
| 6,173,378 B1 | | 1/2001 | Rozario et al. |
| 6,590,901 B1 | * | 7/2003 | Jones .................. 370/428 |
| 6,694,388 B1 | * | 2/2004 | Schzukin et al. ......... 710/52 |
| 6,754,795 B1 | * | 6/2004 | Chen et al. ............. 711/170 |

* cited by examiner

*Primary Examiner*—Melvin Marcelo
(74) *Attorney, Agent, or Firm*—W. James Brady; Frederick J. Telecky, Jr.

(57) ABSTRACT

A method and apparatus for providing multiple queues that share a single memory buffer. A memory buffer is divided into a plurality of fixed length memory segments. Queues are created by chaining one or more memory segments together. Memory segments are allocated on a dynamic basis when needed by a queue. Multiple queues are created wherein each queue consists of a set of one or more memory segments. A list is used to track the memory segments making up a queue. The pointers to the memory segments are stored in a pointer table or a linked list termed a next segment pointer table. Multiple queues are handled by creating multiple linked lists, one for each queue. Each memory segment has associated with it a corresponding next segment pointer. A segment pointer is assigned to each memory segment and is adapted to contain the address of the next segment in the queue. A segment status table comprises bits corresponding to different memory segments that indicate whether a segment is currently available or is occupied as part of a queue. The next segment pointers and status bits are updated dynamically in accordance with read, write, flush and status commands.

18 Claims, 6 Drawing Sheets

TRANSMIT BUFFER WITH DYNAMIC SIZE QUEUES

FIELD OF THE INVENTION

The present invention relates generally to data communication systems and more particularly relates to a transmit buffer made up of multiple dynamic size queues.

BACKGROUND OF THE INVENTION

Almost all communications systems utilize some form of queuing in the transmission and reception of information over the channel. In fact, many communications systems use multiple queues having different Quality of Service (QoS) parameters. In some of these prior art systems, a separate dedicated buffer is maintained for each queue. Buffers of fixed size are allocated and assigned to each queue. This, however, results in inefficient utilization of memory since the empty buffer space in underutilized queues cannot be used for queues that have high utilization and may be nearly full.

In other prior art systems, a dedicated file system management entity is realized for creating and managing the queues. Such a management entity is typically constructed in software thus requiring both hardware and software resources. This complicates the process of creating and managing multiple queues.

Therefore, there is a need for a queuing system that provides multiple independent queues each having individual QoS characteristics that does not suffer from the problems of wasted memory space and complex software execution as in the prior art queuing schemes described above.

SUMMARY OF THE INVENTION

The present invention is a method and apparatus for providing multiple queues that share a single memory buffer. The invention provides an efficient and memory saving technique of providing multiple queues whereby a single memory buffer is shared among the queues. The method of the present invention is particularly useful in any type of system, e.g., communications systems, etc., where multiple queues must be created and maintained.

To aid in illustrating the principles of the present invention, the invention is described in the context of the Bluetooth short-range wireless system. The examples presented hereinbelow are suitable for use in a Bluetooth wireless system. Note, that it is not intended that the invention be limited to the examples presented herein. It is appreciated that one skilled in the art would be able to apply the principles of the invention to numerous other types of communications systems as well.

A memory buffer is divided into a plurality of fixed length memory segments. Queues are created by chaining one or more memory segments together. Multiple queues may be created wherein each queue consists of a set of one or more memory segments. A key feature of the present invention is that the queues created all share the same memory buffer. Memory segments are allocated on a dynamic basis when needed by a queue. This avoids the inefficient prior art technique of allocating a fixed amount of memory for each queue which results in wasted memory from nearly empty queues that use only a small portion of their allotted memory resources.

A list is used to track the memory segments making up a queue. The pointers to the memory segments are stored in a pointer table or a linked list termed a next segment pointer table. Multiple queues are handled by creating multiple linked lists, one for each queue.

Write circuitry is adapted to write data received from a data interface to the appropriate queue and corresponding memory segment in the buffer memory. Read circuitry is adapted to read data from the correct queue and corresponding memory segment in the buffer memory in accordance with read status. A segment controller is adapted to store the pointer, status bits, flags and other related data associated with each of the queues. In addition, the segment controller functions to flush one or more queues and to update the status of the queues and buffer memory.

Each memory segment has associated with it a corresponding next segment pointer. A segment pointer is assigned to each memory segment and is adapted to contain the address of the next segment in the queue. In addition, a segment status table comprises a plurality of bits wherein each bit corresponds to a different memory segment and indicates whether the segment is currently available or is occupied as part of a queue. The next segment pointers and status bits are updated dynamically in accordance with read, write, flush and status commands.

There is thus provided in accordance with the present invention a method of queue management, the method comprising the steps of dividing a buffer memory into a plurality of memory segments, each memory segment comprising a plurality of bytes, constructing a plurality of queues, wherein each queue is assembled from one or more memory segments, providing a write pointer and a read pointer for each queue and providing a plurality of next segment pointers, each next segment pointer associated with a different memory segment and adapted to indicate the next memory segment in a queue.

There is also provided in accordance with the present invention a queue management system comprising a buffer memory divided into a plurality of memory segments, each memory segment comprising a plurality of bytes, means for constructing a plurality of queues, wherein each queue is assembled from one or more memory segments, a write pointer and a read pointer associated with each queue and a plurality of next segment pointers, each next segment pointer associated with a different memory segment and adapted to indicate the next memory segment in a queue.

There is further provided in accordance with the present invention a dynamic queuing system comprising a buffer memory divided into a plurality of memory segments, each memory segment comprising a plurality of bytes, a segment controller operative to construct a plurality of queues, wherein each queue is assembled from one or more of the memory segments, the segment controller adapted to maintain a plurality of next segment pointers and segment status bits, each next segment pointer associated with a memory segment and adapted to indicate the next memory segment in a queue, each segment status bit indicating the availability of a corresponding memory segment, write circuitry adapted to maintain a separate write pointer associated with each queue, the write circuitry adapted to write data to the appropriate memory segment associated with a particular queue and read circuitry adapted to maintain a separate read pointer associated with each queue, the read circuitry adapted to read data from the appropriate memory segment associated with a particular queue.

BRIEF DESCRIPTION OF THE DRAWINGS

The invention is herein described, by way of example only, with reference to the accompanying drawings, wherein.

DETAILED DESCRIPTION OF THE INVENTION

Notation Used Throughout

The following notation is used throughout this document.

| Term | Definition |
| --- | --- |
| FIFO | First in First Out |
| FRF | Final Read Pointer |
| I/F | Interface |
| IRD | Initial Read Pointer |
| IWR | Initial Write Pointer |
| QoS | Quality of Service |
| RAM | Random Access Memory |
| RD | Read Pointer |
| WR | Write Pointer |

Detailed Description of the Invention

The present invention is a method and apparatus for providing multiple queues that share a single memory buffer. The invention provides an efficient and memory saving technique of providing multiple queues whereby a single memory buffer is shared among the queues. The method of the present invention is particularly useful in any type of system, e.g., communications systems, etc., where multiple queues must be created and maintained.

For illustration purposes, the invention is described in the context of the Bluetooth short-range wireless system. The examples presented hereinbelow are suitable for use in a Bluetooth wireless system. Note, that it is not intended that the invention be limited to the examples presented herein. It is appreciated that one skilled in the art would be able to apply the principles of the invention to numerous other types of communications systems as well.

Figure 1:
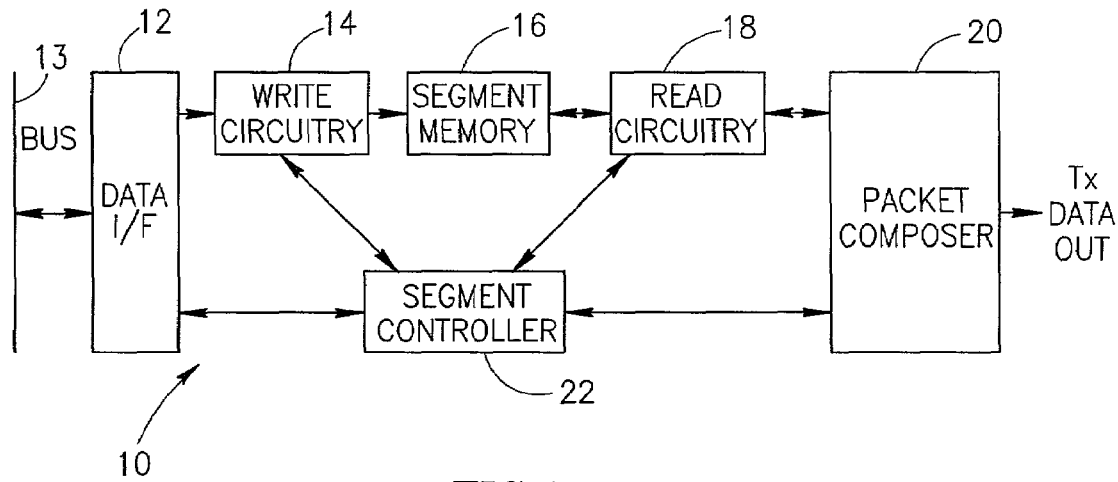
FIG. 1 is a block diagram illustrating a transmit buffer constructed in accordance with the present invention.

A block diagram illustrating a transmit buffer constructed in accordance with the present invention is shown in FIG. 1. The transmit buffer, generally referenced 10, comprises a data interface 12, write circuitry 14, a buffer termed a segment memory 16, read circuitry 18, segment controller 22 and a packet composer 20. The transmit buffer 10 is connected on one side to a data bus 13 from which it receives the data to be transmitted, control and status information. On the other side, the transmit buffer 10 is connected to the packet composer 20 which functions to receive the data read from the buffer. The packet composer 20 generates the appropriate header and trailer information and, together with the data read, assembles the packet for transmission over the channel.

The data interface (I/F) 12 is adapted to reading data to the write circuitry for writing into the buffer. It also is adapted to read and write data, control and status information from and to the segment controller 22. Data can be read or written from or to the bus 13 either synchronously or asynchronously.

The segment memory 16 comprises a memory buffer that preferably consists of a single contiguous memory that is divided into a plurality of preferably fixed length segments. The segment memory may comprise any suitable type of memory such as dynamic RAM, static RAM, dual port RAM, etc. In particular, the segment memory may comprise a cyclic dual port FIFO memory. A queue is created by combining one or more memory segments. Multiple queues may be created wherein each queue consists of a set of one or more memory segments.

A key feature of the present invention is that the queues created all share the same memory buffer. Memory segments are allocated on a dynamic basis when needed by a queue. This avoids the inefficient prior art technique of allocating a fixed amount of memory for each queue which results in wasted memory from nearly empty queues that use only a small portion of their allotted memory resources.

In accordance with the present invention, a queue is constructed from one or more memory segments. A list is used to track the memory segments making up a queue. Any suitable method of creating and maintaining a list of memory segments may be used. In the example embodiment presented herein, pointers to the memory segments are stored in a pointer table or singly linked list. Multiple queues are handled by creating multiple linked lists, one for each queue.

The write circuitry 14 is adapted to write data received from the data interface to the appropriate queue and corresponding memory segment in the buffer memory 16. The read circuitry 18 is adapted to read the data from the correct queue and corresponding memory segment in the buffer memory 16 in accordance with read status. The segment controller 22 comprise any suitable processing means which is adapted to store the pointer, status bits and other related data associated with each of the queues. In addition, the segment controller functions to flush one or more queues and to update the status of the queues and buffer memory.

Figure 2:
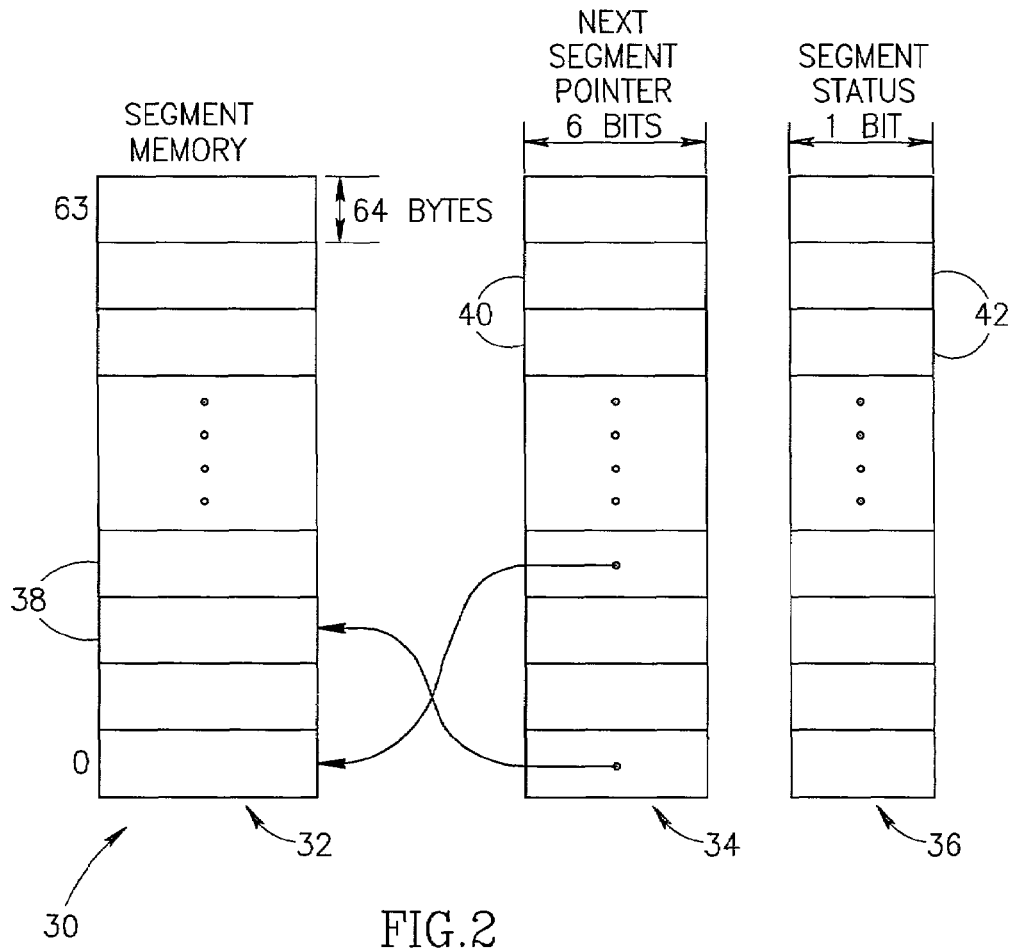
FIG. 2 is a diagram illustrating the segment memory, next segment pointer table and segment status table in more detail.

A diagram illustrating the segment memory, next segment pointer table and segment status table in more detail is shown in FIG. 2. As described above, a shared memory buffer, generally referenced 32, is divided into a plurality of memory segments 38. In the example transmit buffer presented herein, the buffer memory comprises 4 Kbytes and is divided into 64 equal sized segments of 64 bytes each.

A next segment pointer table 34 comprises a plurality of 64 pointer locations 40. Each memory segment 38 has associated with it a corresponding next segment pointer. A segment pointer is assigned to each memory segment and is adapted to contain the address of the next segment in the queue. In addition, a segment status table 36 comprises a plurality of 64 status bits 42. Each status bit corresponds to a different memory segment and is adapted to indicate whether the segment is currently available or is occupied as part of a queue. Note that the next segment pointers and status bits are updated dynamically in accordance with read, write, flush and status commands.

In operation, data is received by the write circuitry 14 and written into a particular queue in the segment memory 16. Data is read out of a particular queue and input to the packet composer 20. The packet composer is operative to read each of the queues, via the read circuitry 18, packet by packet. Note that the segment controller is adapted to flush the queues. Queues can be flushed individually or in any combination of queues.

Figure 3:
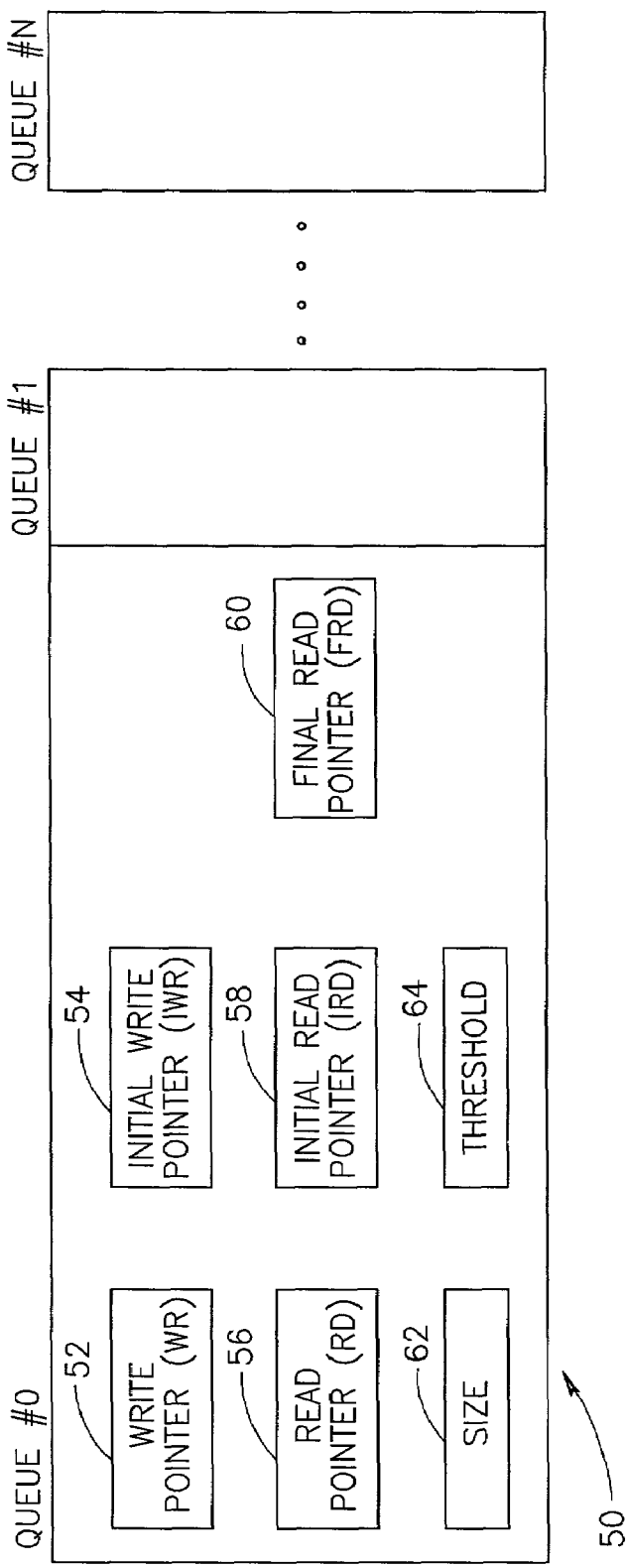
FIG. 3 is a diagram illustrating the write pointer, read pointer and status registers maintained for each queue.

A diagram illustrating the write pointer, read pointer and status registers maintained for each queue is shown in FIG. 3. Each queue, generally referenced 50, is adapted to maintain a set of registers for reading and writing data and for maintaining status information. In particular, each queue comprises a write pointer 52, initial write pointer 54, read pointer 56, initial read pointer 58 and final read pointer 60. In addition, each queue maintains status information registers including the size 62 of the particular queue and a threshold value 64.

The size register contains the number of memory segments currently making up the queue. The size information can also be used to indicate when the queue is empty. The threshold register is set with a value whereby an interrupt is generated or some other suitable indication or notification is generated when the size of the particular exceeds the threshold.

Note that the status flags are generated by comparing the size of the queues to their assigned thresholds. The size of the queues are calculated by subtracting the current write pointer from the initial read pointer while taking into account the number of memory segments currently occupied by the queue. A counter is incremented each time a segment is added to a queue. Likewise, the counter is decremented when a segment is released from the queue.

The set of registers is duplicated for each queue of the N queues established. In the Bluetooth application example presented herein, the transmit buffer is adapted to comprise nine queues, including seven slave queues, one broadcast queue and an addition queue when the master functions as a slave of another network group. Note that the invention is not limited to buffers having nine queues as one skilled in the art can construct buffers having any number of queues.

Note also that without the benefit of the present invention, at least 1 Kbytes would need to be assigned to each buffer. This results in a 9 Kbyte transmit buffer wherein each queue is statically allocated a fixed 1 Kbyte of memory. The example transmit buffer of the present invention requires only 4 Kbytes memory for the same nine queues. The much lower memory requirement is achieved due to the efficient sharing of the buffer space and to the dynamic allocation and release of memory segments to and from queues.

Figure 4:
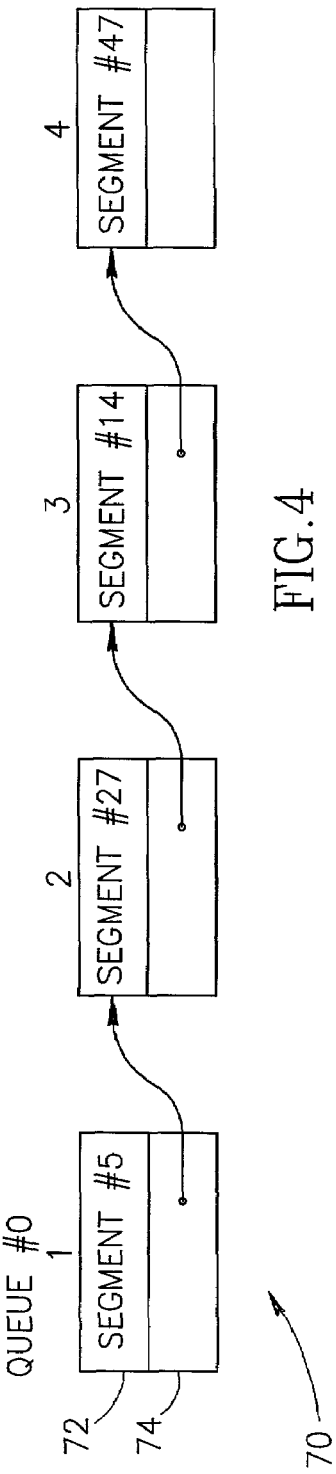
FIG. 4 is a diagram illustrating the structure of an example queue including the segments and next segment pointer values.

A diagram illustrating the structure of an example queue including the segments and next segment pointer values is shown in FIG. 4. To illustrate the principles of the present invention, an example queue, generally referenced 70, is shown comprising four memory segments. The memory segments 72 that make up the queue include segment #5, segment #27, segment #14 and segment #47. The next segment pointer registers 74 contain a pointer to the next segment in the queue. Thus, the next segment pointer of segment 0 points to memory segment #27, the next segment pointer of segment 1 points to memory segment #14 and the next segment pointer of segment 3 points to memory segment #47. The next segment pointer of memory segment 4 contains the NUL value since it is the last segment in the queue.

Thus in this fashion, the next segment pointer table comprises a pointer for each memory segment that is part of a queue. Note that as an alternative to using a table, the next segment pointers can be stored in a singly or doubly linked list whereby a separate linked list is maintained for each queue in the buffer. In an alternative embodiment to using a separate table or linked list, all locations but the last within each memory segment are used to store data while the last location is used to store the next segment pointer.

Figure 5:
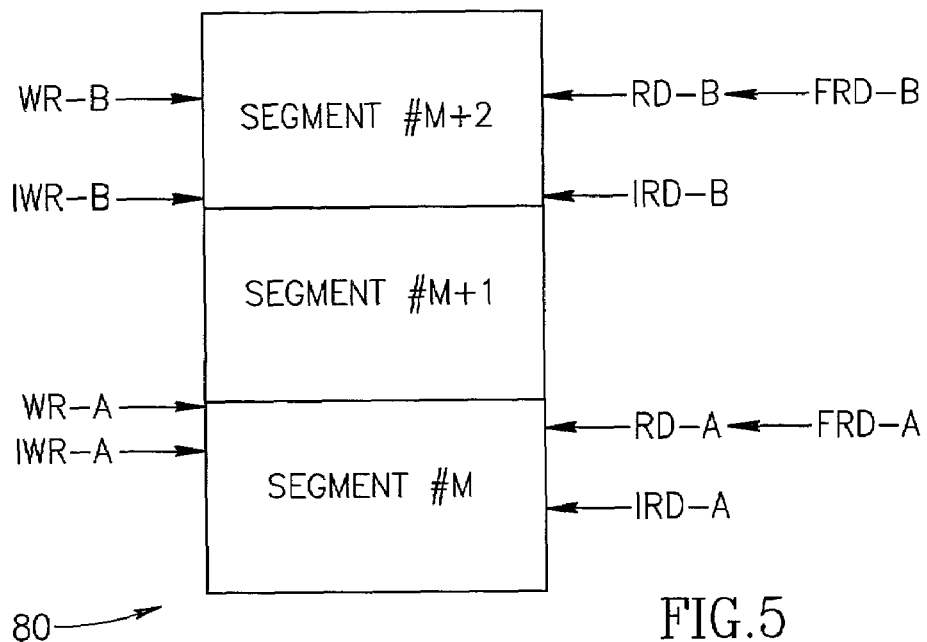
FIG. 5 is a diagram illustrating the read and write pointers for two queues within a portion of the segment memory.

A diagram illustrating the read and write pointers for two queues within a portion of the segment memory are shown in FIG. 5. A set of read and write pointers as described above are maintained for each queue. The portion of the segment memory, generally referenced 80, illustrated includes three memory segments, labeled segment #M, segment M+1 and segment M+2. As an example, the pointers for two queues A and B are shown. The reading and writing methods including the modification of the pointers will now be described in more detail.

The methods of reading and writing data from and to the queue are described in the context of the example transmit buffer presented above. Note that one skilled in the arts can apply the methods of the present invention to buffers containing any number of queues.

Figure 6:
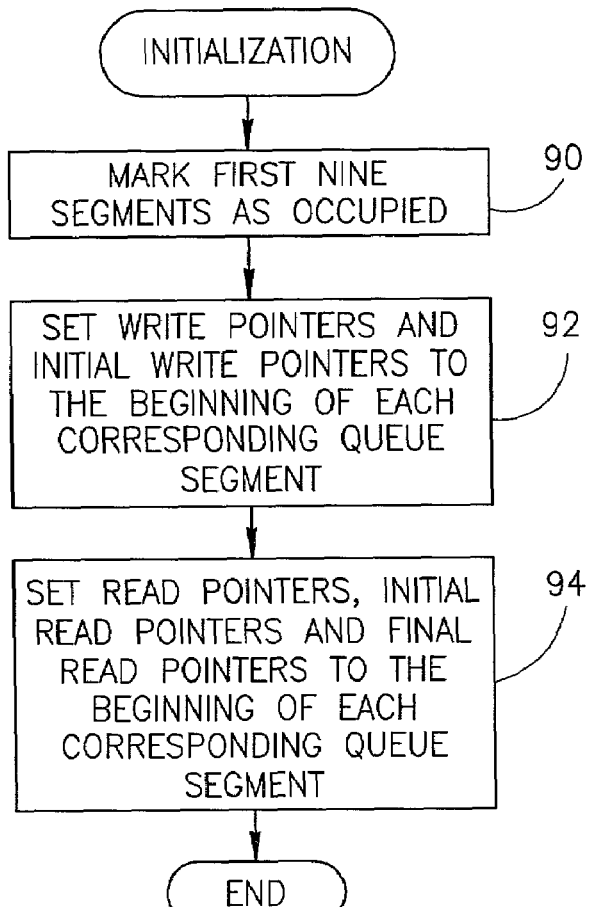
FIG. 6 is a flow diagram illustrating the initialization process of the transmit buffer of the present invention.

A flow diagram illustrating the initialization process of the transmit buffer of the present invention is shown in FIG. 6. With reference to FIG. 5 as well, upon reset or power up, a number of segments equal to the desired number of queues to be implemented are marked as occupied (step 90). Thus, these nine segments are ready for storing data from each of the nine queues. The next segment pointers, however, are not valid yet, i.e. contain the NUL value. For example, a one in the segment status bit indicates a segment is occupied and a zero indicates it is available. In the example presented herein, the first nine segments are marked as occupied. Note that each queue always comprises at least one memory segment.

For nine queues, nine sets of pointers are required to be maintained. Each set of pointers includes: a write pointer (WR), initial write pointer (IWR), read pointer (RD), initial read pointer (IRD) and a final read pointer (FRD).

Upon initialization, the write pointer and initial write pointer of each queue is set to point to the start of each corresponding memory segment (step 92). Similarly, the read pointer, initial read pointer and a final read pointer of each queue are set to point to the start of each corresponding queue segment (step 94).

Figure 7:
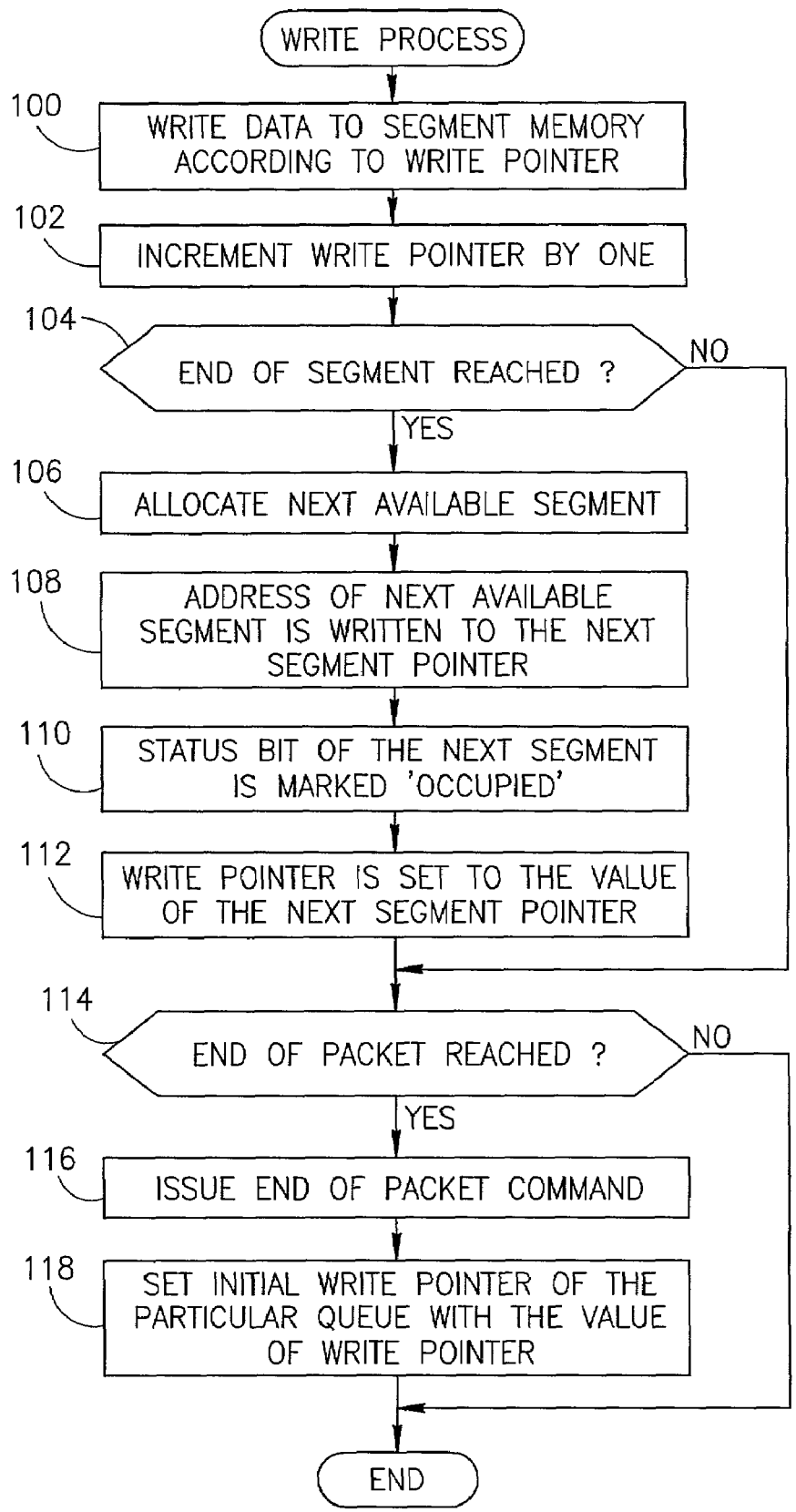
FIG. 7 is a flow diagram illustrating the write process of the transmit buffer of the present invention.

A flow diagram illustrating the process of storing data in a queue in the transmit buffer of the present invention is shown in FIG. 7. The process illustrated is performed for each byte to be stored. In the embodiment described herein, writing and reading to and from the queues are via memory-mapped locations. Thus, each queue is assigned a write and read address. The queues can be written to in any arbitrary order and at any time and are independent of each other as each queue maintains its own set of read and write pointers.

For each queue, the write pointer indicates the address location of the next byte to be written to. The initial write pointer indicates the address location of the beginning of the packet currently being written to each queue. Each byte of data is written to the appropriate memory segment at the location pointed to by the write pointer associated with the particular queue (step 100). The write pointer of the queue corresponding to the byte just written is then incremented (step 102).

It is then checked whether the end of the memory segment has been reached, i.e. the $64^{th}$ byte position in the memory segment was just written to (step 104). If the end has been reached, the next available memory segment is allocated to the queue (step 106). The segment controller 22 (FIG. 1) functions to find the next available memory segment from the segment status table. The address of the next available memory segment is written to the next segment pointer associated with the segment currently being written to (step 108). The segment status bit of the next memory segment is marked as occupied (step 110).

The write pointer is then set to the address value of the next segment pointer (step 112). The write pointer then contains the address of the beginning of the next memory segment in the queue. In addition, as each memory segment is added to a queue, a segment counter associated with that queue is incremented. When the memory segments of a queue are released, this counter is decremented.

It is then checked whether the end of a packet has been reached (step 114). The end of packet using any suitable detection means. For example, after the last byte is written to the queue, an end of packet command is issued by the host and received by the segment controller (step 116). In response, the initial write pointer associated with the particular queue is set to the value of the write pointer (step 118). The initial write pointer is held fixed until an entire packet is written to the queue. During read operations, the queue is read up to the initial write pointer. Thus, the reading of a packet from the queue is delayed until the entire packet has been written to the queue. This insures that the packet composer does not begin transmitting a packet before it has been written completely to the queue.

Figure 8:
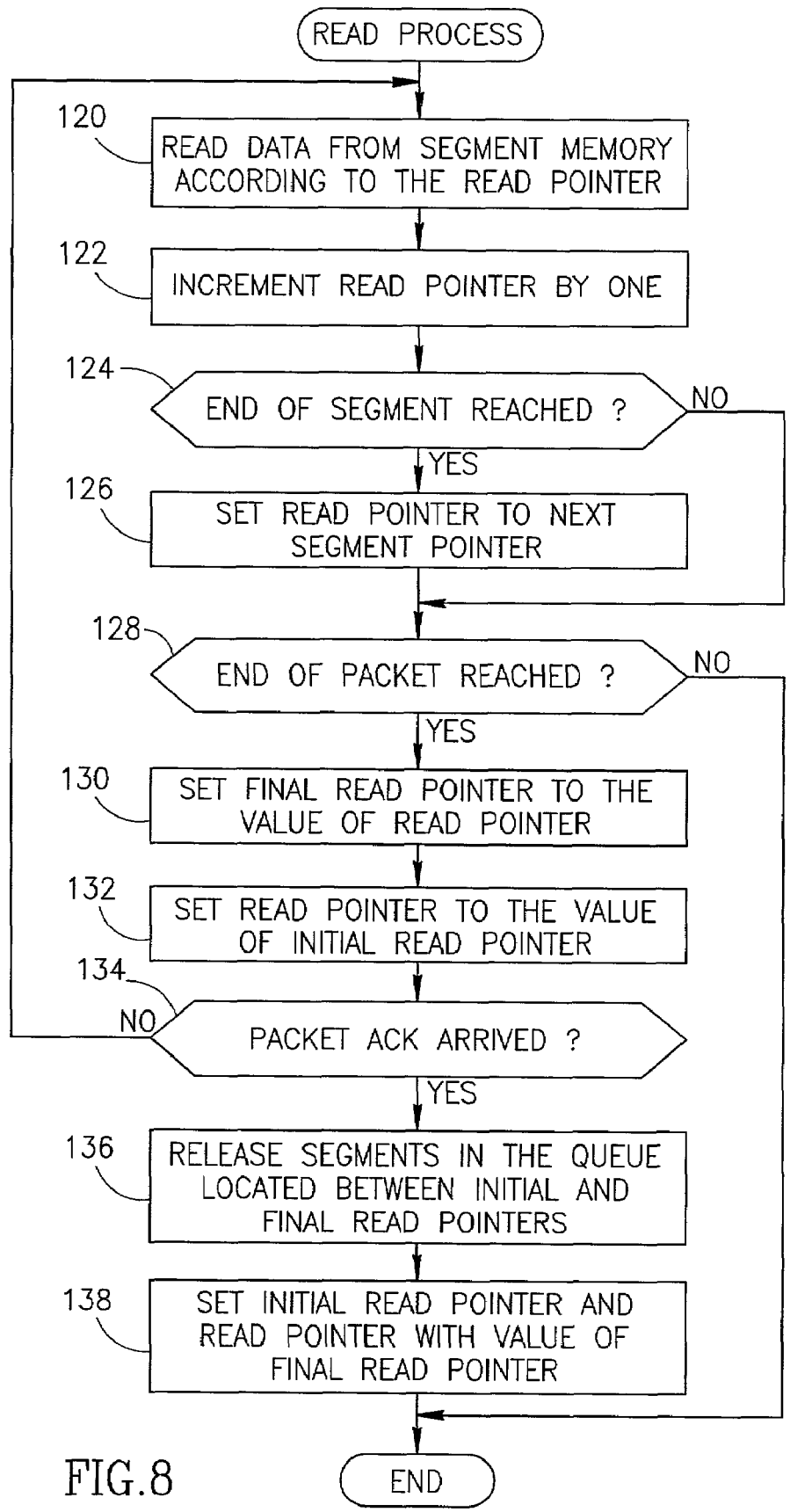
FIG. 8 is a flow diagram illustrating the read process of the transmit buffer of the present invention.

A flow diagram illustrating the read process of the transmit buffer of the present invention is shown in FIG. 8. The process illustrated is performed for each byte read. Reading is performed from the same queue until an entire packet is read, i.e. until an end of packet is detected. This is in contrast to writing wherein each byte written can be to a different queue. Note that in an alternative embodiment, data may be read from the queues in a random fashion.

The read process utilizes three pointers for each queue: read pointer (RD), initial read pointer (IRD) and the final read pointer (FRD). The read pointer is used to indicate the address of the next byte to be read for a particular queue. The initial read pointer indicates the address of the beginning location of the current packet in a queue. The final read pointer indicates the first address location of the next packet in a queue.

Note that in the Bluetooth example presented herein, the first byte of each packet comprises the packet type of the packet to be transmitted. In addition, the packet composer functions to determine the length of a packet by decoding the length field. The length field in a Bluetooth packet is located in the first one or two bytes of the data payload. In the event the packet composer loses synchronization with the packet boundaries, the queue must be flushed thus resulting in the loss of all packets in the queue.

Initially, the triplet of pointers, including the read pointer, initial read pointer and the final read pointer are pointing to the address of the first byte of the first segment of the queue. A data byte is read from the memory segment of a queue in accordance with the value of the read pointer (step 120). After data is read from the queue, the read pointer associated with that queue is incremented (step 122).

It is then checked whether the read pointer has reached the end of a memory segment (step 124). If the end of a segment has been reached, the read pointer is set to the contents of the next segment pointer (step 126).

If the end of a packet is reached (step 128) the final read pointer is loaded with the contents of the read pointer (step 130). The read pointer is then set to the contents of the initial read pointer (step 132). The read pointer is set to the initial read pointer so that the packet can be read again from the queue in the event that transmission of the packet is not successful.

If an acknowledgement (ACK) is not received (step 134), the packet is read again from the queue and re-transmitted, the read process continues with step 120. If an acknowledgement is received, the memory segments used by the queue starting from the initial read pointer and ending with the final read pointer are released, i.e. returned to the segment pool for use in another queue (step 136). Each of the segments is released one by one utilizing the next segment pointers to traverse the segments used by the queue. For each memory segment, the segment status bit is cleared thus indicating that the memory segment is available for use. Once all the memory segments are released, the value of the read pointer and the initial read pointer are set to the value of the final read pointer (step 138).

Figure 9:
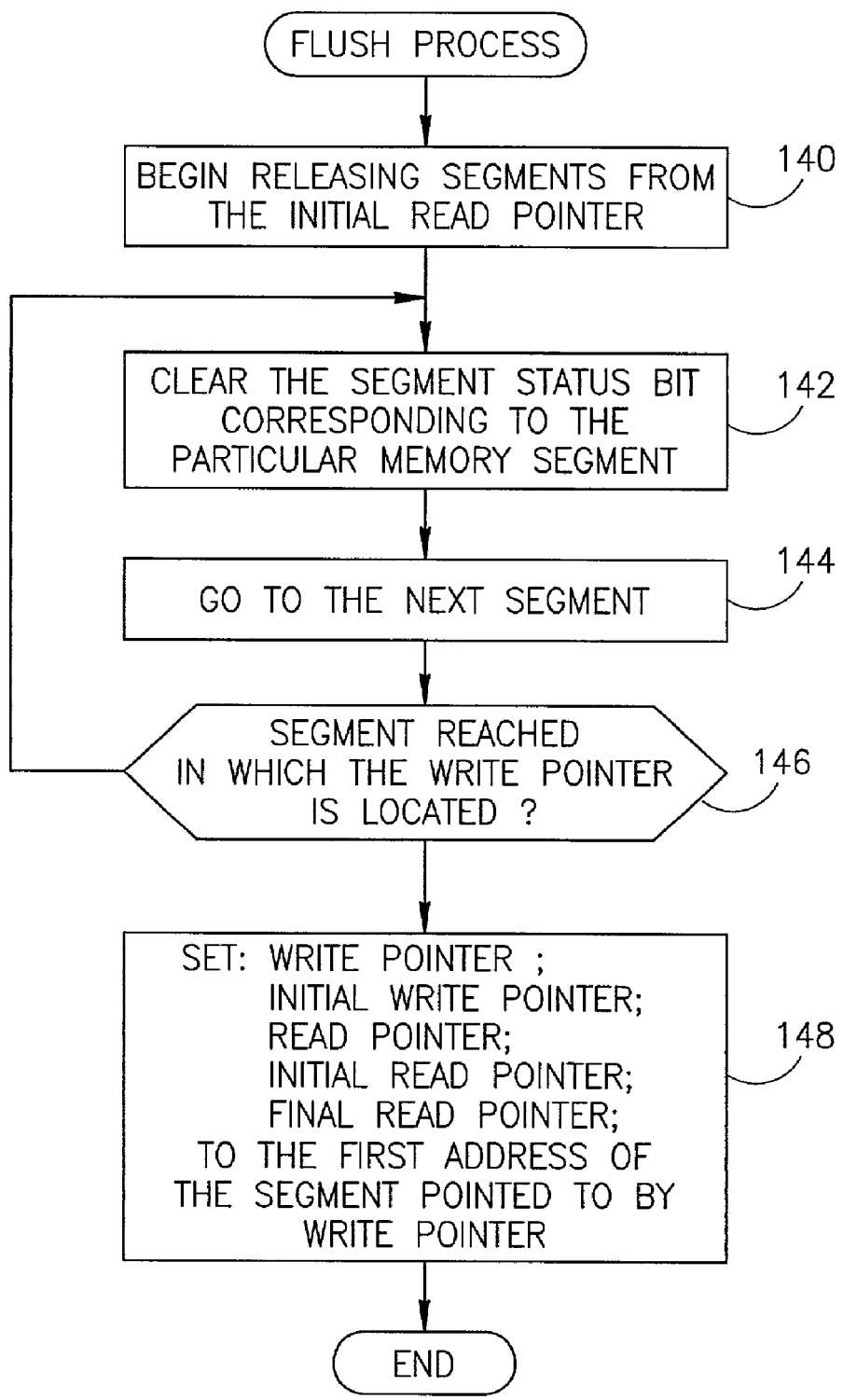
FIG. 9 is a flow diagram illustrating the flush process of the transmit buffer of the present invention.

A flow diagram illustrating the flush process of the transmit buffer of the present invention is shown in FIG. 9. The segment controller in the transmit buffer of the present invention comprises the capability of flushing one or more queues. Each queue can be flushed separately or a combination of queues can be flushed together. Depending on the implementation, the flushing of several queues can be performed serially or in parallel.

In the example provided herein, a hard or a soft flush may be performed. With a hard flush, the queue is flushed immediately. If a packet is in the middle of transmission, however, the segment controller waits until transmission is complete. When a soft flush command is received, the segment controller waits until the current packet has been successfully transmitted, i.e. no packet waiting to be acknowledged.

The flush process is similar to the process of releasing memory segments after a packet is read. When a queue is flushed, the segment controller begins releasing memory segments from the initial read pointer (step 140). The segment status bit corresponding to the particular memory segment is cleared, i.e., set to zero (step 142). The next segment pointer is used to find the next segment to be cleared (step 144). This process continues until the memory segment is reached in which the write pointer is located (step 146). This indicates that the flush is finished. The last memory segment is not released since each queue comprises at least one memory segment.

Once the last memory segment in the queue is reached, the write pointer, initial write pointer, read pointer, initial read pointer and final read pointer are all loaded with the first address of the memory segment pointed to by the value of the write pointer.

It is intended that the appended claims cover all such features and advantages of the invention that fall within the spirit and scope of the present invention. As numerous modifications and changes will readily occur to those skilled in the art, it is intended that the invention not be limited to the limited number of embodiments described herein. Accordingly, it will be appreciated that all suitable variations, modifications and equivalents may be resorted to, falling within the spirit and scope of the present invention.

What is claimed is:

1. A method of queue management, said method comprising the steps of:
   dividing a buffer memory into a plurality of memory segments, each memory segment comprising a plurality of bytes;
   constructing a plurality of queues, wherein each queue is assembled from one or more memory segments;
   providing a write pointer and a read pointer for each queue;
   providing a plurality of next segment pointers, each next segment pointer associated with a different memory segment and adapted to indicate the next memory segment in a queue; and
   flushing a queue wherein the memory segments comprising a queue are released up to but not including the memory segment corresponding to said write pointer.

2. The method according to claim 1, wherein said step of flushing comprises indicating that a memory segment is free via a segment status bit associated with each memory segment released.

3. A method of queue management, said method comprising the steps of:
   dividing a buffer memory into a plurality of memory segments, each memory segment comprising a plurality of bytes;
   constructing a plurality of queues, wherein each queue is assembled from one or more memory segments;
   providing a write pointer and a read pointer for each queue;
   providing a plurality of next segment pointers, each next segment pointer associated with a different memory segment and adapted to indicate the next memory segment in a queue;
   providing an initial write pointer for each queue established;
   incrementing said write pointer when data is written to a queue;
   holding said initial write pointer constant while data is written to a queue; and
   setting said initial write pointer to the value of the write pointer when an end of packet is detected.

4. A method of queue management, said method comprising the steps of:
   dividing a buffer memory into a plurality of memory segments, each memory segment comprising a plurality of bytes;
   constructing a plurality of queues, wherein each queue is assembled from one or more memory segments;
   providing a write pointer and a read pointer for each queue;
   providing a plurality of next segment pointers, each next segment pointer associated with a different memory segment and adapted to indicate the next memory segment in a queue;
   providing an initial read pointer and a final read pointer for each queue established;
   incrementing said read pointer when data is read from a queue;
   holding said initial read pointer and said final read pointer constant while data is read from a queue;
   setting said final read pointer to the value of said read pointer and said read pointer to the value of said initial read pointer when an end of packet is detected;
   if an acknowledgement is received, setting said initial read pointer and said final read pointer to the value of said read pointer; and
   if an acknowledgement is not received, re-reading data from said queue from said initial read pointer through said final read pointer.

5. The method according to claim 4, further comprising the step of releasing the memory segments in said queue between said initial read pointer and said final read pointer.

6. A queue management system, comprising;
   a buffer memory divided into a plurality of memory segments, each memory segment comprising a plurality of bytes;
   means for constructing a plurality of queues, wherein each queue is assembled from one or more memory segments;
   a write pointer and a read pointer associated with each queue;
   a plurality of next segment pointers, each next segment pointer associated with a different memory segment and adapted to indicate the next memory segment in a queue; and
   means for flushing a queue wherein the memory segments comprising a queue are released up to but not including the memory segment corresponding to said write pointer.

7. The system according to claim 6, wherein said means for flushing is adapted to indicate that a memory segment is free via a segment status bit associated with each memory segment released.

8. A queue management system, comprising;
   a buffer memory divided into a plurality of memory segments, each memory segment comprising a plurality of bytes;
   means for constructing a plurality of queues, wherein each queue is assembled from one or more memory segments;
   a write pointer and a read pointer associated with each queue;
   a plurality of next segment pointers, each next segment pointer associated with a different memory segment and adapted to indicate the next memory segment in a queue;
   an initial write pointer associated with each queue established;
   means for incrementing said write pointer while data is written to a queue;
   means for holding said initial write pointer constant while data is written to a queue; and
   means for setting said initial write pointer to the value of the write pointer when an end of packet is detected.

9. A queue management system, comprising;
   a buffer memory divided into a plurality of memory segments, each memory segment comprising a plurality of bytes;
   means for constructing a plurality of queues, wherein each queue is assembled from one or more memory segments;
   a write pointer and a read pointer associated with each queue;
   a plurality of next segment pointers, each next segment pointer associated with a different memory segment and adapted to indicate the next memory segment in a queue;
   an initial read pointer and a final read pointer associated with each queue established;
   means for incrementing said read pointer when data is read from a queue;
   means for holding said initial read pointer and said final read pointer constant while data is read from a queue;

means for setting said final read pointer to the value of said read pointer and said read pointer to the value of said initial read pointer when an end of packet is detected;

means for setting said initial read pointer and said final read pointer to the value of said read pointer if acknowledgement is not received; and means for re-reading data from said queue from said initial read pointer through said final read pointer if an acknowledgment is not received.

10. The system according to claim 9, further comprising means for releasing the memory segments in said queue between said initial read pointer and said final read pointer.

11. A dynamic queuing system, comprising:

a buffer memory divided into a plurality of memory segments, each memory segment comprising a plurality of bytes;

a segment controller operative to construct a plurality of queues, wherein each queue is assembled from one or more of said memory segments, said segment controller adapted to maintain a plurality of next segment pointers and segment status bits, each next segment pointer associated with a memory segment and adapted to indicate the next memory segment in a queue, each segment status bit indicating the availability of a corresponding memory segment;

write circuitry adapted to maintain a separate write pointer associated with each queue, said write circuitry adapted to write data to the appropriate memory segment associated with a particular queue; and read circuitry adapted to maintain a separate read pointer associated with each queue, said read circuitry adapted to read data from the appropriate memory segment associated with a particular queue.

12. The system according to claim 11, wherein said write circuitry comprises:

means for incrementing said write pointer when data is written to a queue;

means for allocating an available memory segment when the current memory segment becomes full; and means for setting the next segment pointer associated with the current memory segment to point to the memory segment allocated to the queue.

13. The system according to claim 11, further comprising means for flushing a queue wherein the memory segments comprising a queue are released up to but not including the memory segment corresponding to said write pointer.

14. The system according to claim 11, further comprising means for flushing a queue wherein the segment status bits associated with the memory segments making up a queue are cleared up to but not including the memory segment corresponding to said write pointer.

15. The system according to claim 11, wherein said read circuitry comprises:

means for incrementing said read pointer when data is read from a queue; and means for setting said read pointer in accordance with the next segment pointer associated with the memory segment currently being read when the end of a memory segment is reached.

16. The system according to claim 11, wherein said write circuitry comprises:

an initial write pointer associated with each queue established;

means for incrementing said write pointer while data is written to a queue;

means for holding said initial write pointer constant while data is written to a queue; and means for setting said initial write pointer to the value of the write pointer when an end of packet is detected.

17. The system according to claim 11, wherein said read circuitry comprises:

an initial read pointer and a final read pointer associated with each queue established;

means for incrementing said read pointer when data is read from a queue;

means for holding said initial read pointer and said final read pointer constant while data is read from a queue;

means for setting said final read pointer to the value of said read pointer and said read pointer to the value of said initial read pointer when an end of packet is detected;

means for setting said initial read pointer and said final read pointer to the value of said read pointer if an acknowledgement is received; and means for re-reading data from said queue from said initial read pointer through said final read pointer if an acknowledgement is not received.

18. The system according to claim 17, further comprising means for releasing the memory segments in said queue between said initial read pointer and said final read pointer.

* * * * *